US008237851B2

(12) United States Patent
Ngo et al.

(10) Patent No.: US 8,237,851 B2
(45) Date of Patent: Aug. 7, 2012

(54) CIRCUITS AND METHODS FOR CALIBRATING LENS DISPLACEMENT (75) Inventors: Sang Ton Ngo, San Jose, CA (US); Thomas O'Brien, Powell, OH (US); Sridhar Kotikalapoodi, Santa Clara, CA (US); M. Abid Hussain, Los Altos, CA (US)

(73) Assignee: Summit Microelectronics, Inc, Sunnyvale, CA (US)

( * ) Notice: Subject to any disclaimer, the term of this patent is extended or adjusted under 35 U.S.C. 154(b) by 327 days.

(21) Appl. No.: 12/497,237

(22) Filed: Jul. 2, 2009

(65) Prior Publication Data
US 2011/0001832 A1 Jan. 6, 2011

(51) Int. Cl.
 H04N 5/232 (2006.01)
 G03B 13/00 (2006.01)
 G01R 27/26 (2006.01)
(52) U.S. Cl. .......... 348/357; 324/658; 324/679
(58) Field of Classification Search ........ 348/357, 348/335, 361, 360; 324/679, 658
See application file for complete search history.

(56) References Cited

U.S. PATENT DOCUMENTS

| | | | | |
|---|---|---|---|---|
| 6,975,123 B1 * | 12/2005 | Malang et al. | .............. | 324/658 |
| 7,388,247 B1 * | 6/2008 | Lagnado et al. | ............ | 257/312 |
| 2006/0006883 A1 * | 1/2006 | Foote | .............. | 324/678 |
| 2008/0204046 A1 * | 8/2008 | Bartling | .............. | 324/658 |
| 2008/0204049 A1 * | 8/2008 | Kawate et al. | ............ | 324/679 |
| 2009/0224716 A1 * | 9/2009 | Vig et al. | .............. | 318/550 |

OTHER PUBLICATIONS

R.C. Gutierrez, E.R. Fossum, T.K. Tang, "Auto-Focus Technology," Siimpel Corporation, Pasadena, CA, Aug. 2007.

* cited by examiner

Primary Examiner — Tuan Ho
Assistant Examiner — Shahbaz Nazrul
(74) Attorney, Agent, or Firm — Fountainhead Law Group P.C.

(57) ABSTRACT

Embodiments of the present invention include circuits and methods for calibrating lens displacement in a voltage controlled actuator. In one embodiment, a calibration circuit comprises a programmable voltage source that provides a voltage to a control terminal of an actuator to set a lens displacement, a switch that selectively decouples said programmable voltage source from said control terminal, a current source that provides a reference current to said control terminal when the control terminal is decoupled from said programmable voltage source, a comparator that senses a voltage difference between said programmable voltage source and said control terminal, and a timer coupled to an output of the comparator. The timer measures a time period required to increase the control terminal voltage. The capacitance of the actuator may be determined and used to calibrate the position of a lens.

19 Claims, 9 Drawing Sheets

CIRCUITS AND METHODS FOR CALIBRATING LENS DISPLACEMENT

BACKGROUND

The present invention relates to calibration, and in particular, to circuits and methods for calibrating lens displacement.

Cellular phones, personal digital assistants, and a number of portable devices now include miniature electronic cameras. Many consumers have begun to use these miniature cameras as their principle means for capturing memorable photographs. Consequently, consumers now expect these miniature cameras to provide high quality photographs such as those provided by a stand alone digital camera. Correct focal length adjustment in miniature cameras is crucial in providing high quality images in a digital camera.

Digital cameras commonly utilize auto-focus (AF). For miniature cameras, implementing AF requires reduced size and power. Stepper motors, which have been traditionally used in digital camera's for the AF feature, do not scale well for miniature cameras. Additionally, active AF systems that use structural light or ultrasonics to determine focus cannot be scaled. These systems may also consume too much power.

Several technologies are being developed for AF in miniature cell phone cameras. These include lens motion type AF, lens modification type AF, and extended depth of field AF. The lens motion type AF includes voice coil, piezoelectric, electopolymer, and micro-electro-mechanical-system (MEMS) technologies. In all these technologies, high quality images require precise alignment and motion control of the lens relative to the imager. Calibration of the drive signals according to the lens actuator's displacement may be necessary in order to get high quality images in a digital camera using AF.

Current calibration techniques require laser metrology to measure distances and correlate the lens displacement to control settings. This is a slow and costly process for manufacturing and cannot be practically implemented in the device for use in the field.

Thus, there is a need for improved lens displacement calibration. The present invention solves these and other problems by providing circuits and methods for calibrating lens displacement.

SUMMARY

Embodiments of the present invention improves lens calibration. In particular, embodiments of the present invention include circuits and methods for calibrating lens displacement in a voltage controlled actuator using capacitance measurements.

In one embodiment, the present invention includes a calibration circuit comprising a programmable voltage source that provides a control voltage to a control terminal of an actuator to set a lens displacement of the actuator, a switch that selectively decouples said programmable voltage source from said control terminal in response to a first signal, a current source that provides a reference current to said control terminal when the control terminal is decoupled from said programmable voltage source, a comparator that senses a voltage difference between said programmable voltage source and said control terminal, and a timer coupled to an output of the comparator, wherein the timer measures a time period between a point in time when the current source is activated and a point in time when the voltage difference between said programmable voltage source and said control terminal increases to a threshold.

In one embodiment, said time period is used to determine said lens displacement.

In one embodiment, the present invention further comprises a controller for programming the programmable voltage source and receiving timing information from the timer.

In one embodiment, the present invention further comprises a memory coupled to said controller, wherein said controller retrieves calibration factors from said memory to determine said lens displacement.

In one embodiment, said timer is a counter.

In one embodiment, the comparator is enabled after a settling period associated with said decoupling.

In one embodiment, the programmable voltage source includes a digital-to-analog converter.

In one embodiment, the programmable voltage source, the current source, the comparator, and the timer are manufactured on a signal integrated circuit.

In one embodiment, the signal integrated circuit further comprises a digital interface to receive program voltages and send said time period.

In another embodiment, the present invention includes a method of calibrating lens displacement comprising providing a control voltage from a programmable voltage source to a control terminal of an actuator to set a lens displacement of the actuator, selectively decoupling said programmable voltage source from said control terminal in response to a first signal, providing a reference current to said control terminal from a current source when the control terminal is decoupled from said programmable voltage source, comparing a voltage difference between said control voltage from the programmable voltage source and a voltage on said control terminal, wherein said voltage on said control terminal changes in response to said reference current, measuring a time period between a point in time when the current source is activated and a point in time when the voltage difference increases to a threshold.

In one embodiment, said time period is used to determine said lens displacement.

In one embodiment, said time period is used to generate a pluarality of voltages and corresponding lens displacements.

In one embodiment, said time period is used to determine said lens displacements in a digital camera.

In one embodiment, said time period is used to determine said lens displacements in a digital camera while the camera is in use.

In one embodiment, the present invention further comprises programming the programmable voltage source from a controller and receiving timing information from the timer in said controller.

In one embodiment, the present invention further comprises storing calibration factors in a memory coupled to said controller, wherein said controller retrieves calibration factors from said memory to determine said lens displacement.

In one embodiment, said measuring a time period is performed by a counter.

In one embodiment, said comparing occurs after a settling period associated with said decoupling.

In one embodiment, providing a control voltage includes receiving a digital signal representing a voltage to be applied to said actuator, and converting the digital signal to an analog voltage.

The following detailed description and accompanying drawings provide a better understanding of the nature and advantages of the present invention.

DETAILED DESCRIPTION

Described herein are techniques for lens calibration. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1A:
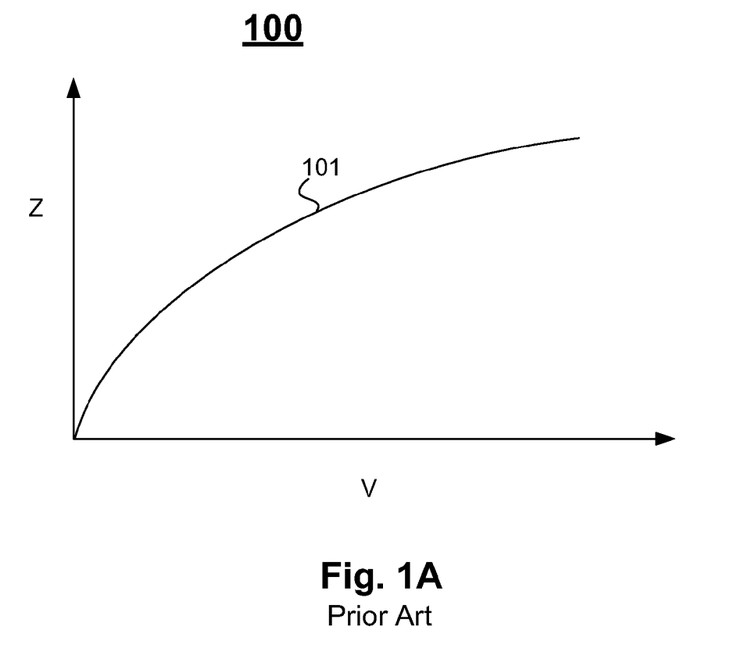
FIG. 1A illustrates a graph showing how a lens displacement may vary with control voltage.

FIG. 1A illustrates a graph 100 showing how a lens displacement may vary with control voltage in a voltage controlled lens displacement system. Graph 100 includes a voltage (V) versus displacement (Z) characteristic 101. An actuator may be controlled by a control voltage, and the position of the actuator in response to a voltage V may vary according to characteristic 101.

Figure 1B:
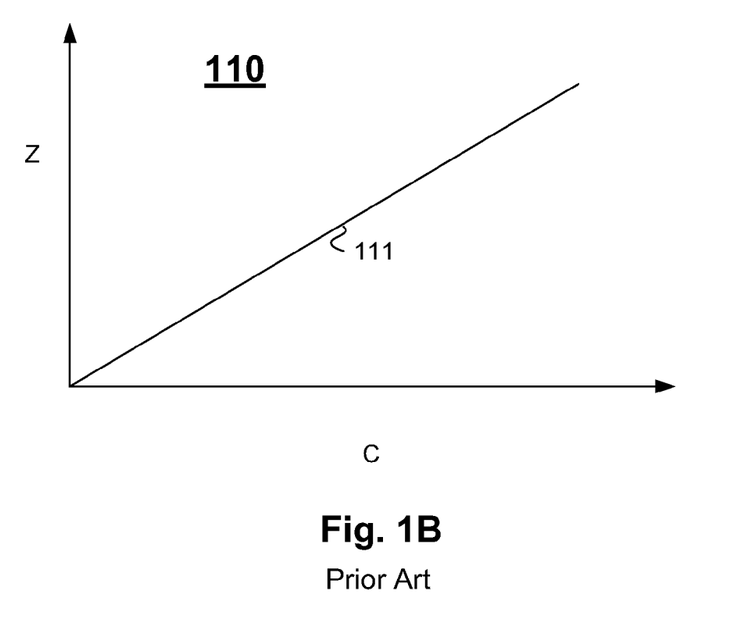
FIG. 1B illustrates and a graph showing how the lens displacement may vary with capacitance on the control terminal.

FIG. 1B illustrates and a graph 110 showing how the lens displacement may vary with capacitance on the control terminal. Graph 110 includes a capacitance (C) versus displacement (Z) characteristic 111 of an actuator. For some actuators, the capacitance C may have a linear relationship with displacement Z similar to characteristic 111. Providing calibration according to the capacitance may provide better lens displacement control and increase the accuracy of an AF mechanism.

Figure 2:
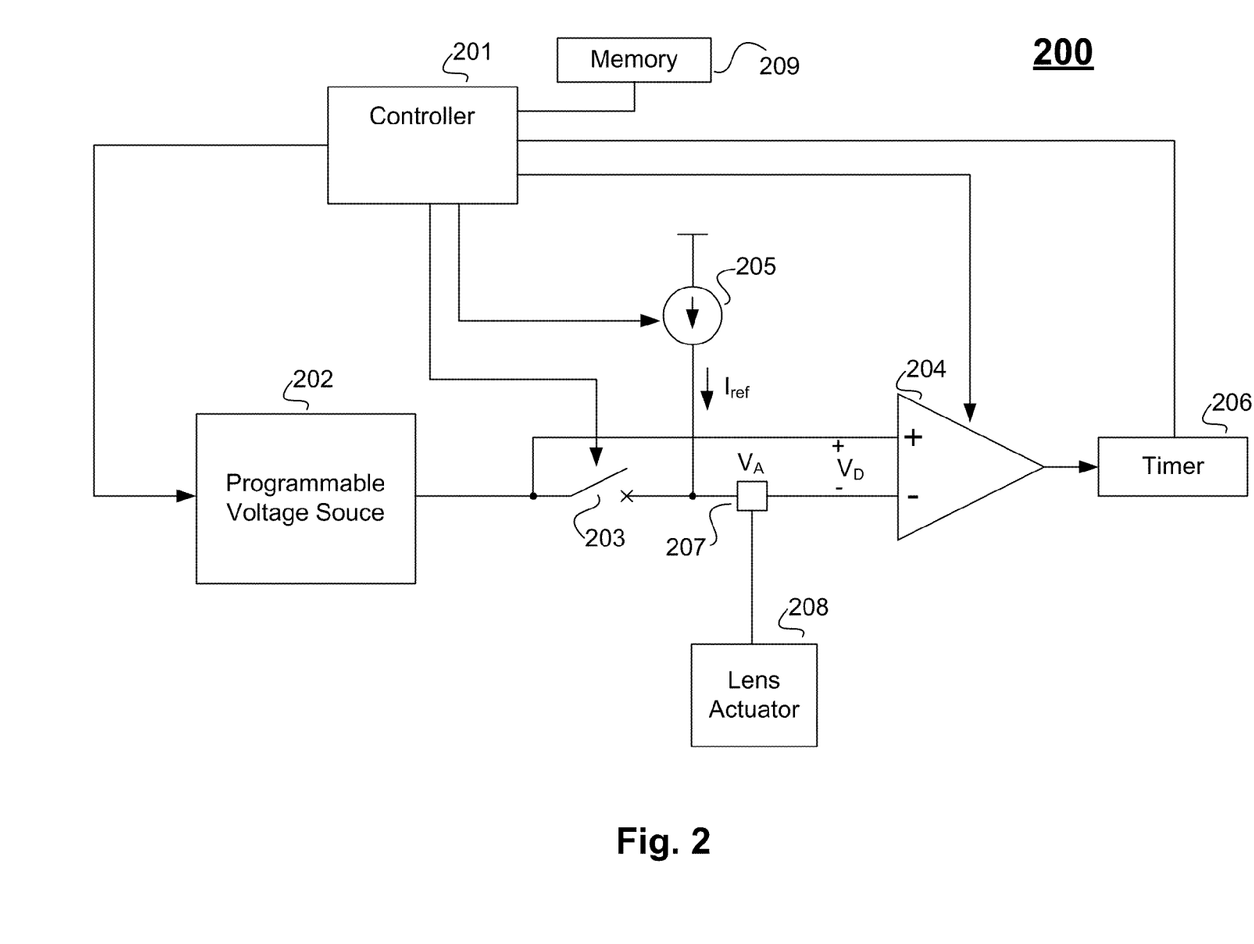
FIG. 2 illustrates a calibration circuit for calibrating lens displacement according to one embodiment of the present invention.

FIG. 2 illustrates a calibration circuit for calibrating lens displacement 200 according to one embodiment of the present invention. Calibration circuit 200 includes controller 201, programmable voltage source 202, switch 203, comparator 204, timer 206, current source 205, and actuator 208. During normal operation, controller 201 may send digital control signals to programmable voltage source 202 to produce a voltage on control terminal 207 of actuator 208 to change the position of a lens, for example. Features and advantages of the present invention include decoupling the control terminal 207 from the programmable voltage source 202 and measuring the capacitance at the actuator control terminal 207 to calibrate the position of a lens.

As mentioned above, during normal operation controller 201 may provide digital signals to programmable voltage source 202 in order to provide a control voltage to control terminal 207. Accordingly, programmable voltage source 202 provides a control voltage on control terminal 207 when switch 203 is closed. The control voltage may be used to set a lens displacement of actuator 208. The actuator 208 may be a lens actuator such as a MEMs device, for example. Controller 201 may store digital values for generating voltages corresponding to different positions of a lens as described in FIG. 1A. However, the voltage versus lens displacement may not be accurate and may vary during normal operation. As mentioned above, capacitance at the actuator control terminal 207 may be a more accurate measure of lens displacement. Therefore, the capacitance at the actuator terminal may be measured and used to set adjust voltage on control terminal 207 to achieve a more accurate displacement.

Initially, a digital signal is sent to programmable voltage source 202. The digital signal generates a voltage at the output of the programmable voltage source 202 corresponding to a desired lens displacement. After the voltage is applied, the capacitance may be measured to determine a more accurate assessment of the lens displacement, and the system may be adjusted accordingly. In this example, switch 203 selectively decouples programmable voltage source 202 from control terminal 207 in response to an activation signal from controller 201. Actuator 208 may have a capacitance coupled to control terminal 207 to hold the voltage $V_A$ after switch 203 decouples programmable voltage source 202 from control terminal 207. Initially, after switch 203 is opened, the voltage at the output of the programmable voltage source 202 and the voltage on control terminal 207 are the same. The decoupling allows a capacitance on control terminal 207 to be isolated.

Current source 205 may provide the reference current $I_{ref}$ to control terminal 207 in response to receiving an enable signal from controller 201 enabling the current source. Current source 205 may be enabled after a settling time associated with the opening of switch 203. In this example, actuator voltage, $V_A$, on control terminal 207 increases in response to receiving the reference current $I_{ref}$.

Comparator 204 includes a first input coupled to an output of comparator 202 and a second input coupled to control terminal 207. Comparator 204 senses a voltage difference $V_D$ between the programmable voltage source 202 and control terminal 207 after switch 203 is opened. Comparator 204 may be enabled by controller 201 after a settling time associated with the opening of switch 203, for example. In one embodiment, comparator 204 includes an internal threshold voltage. For example, if the voltage on the negative input terminal of comparator 204 (here, the voltage on control terminal 207) is greater than (or equal to) the voltage on the positive input terminal of comparator 204 (here, the output voltage of programmable voltage source 202) by an amount that is greater than a threshold, then the comparator may trigger. The threshold voltage of comparator 204 may correspond to an internal offset voltage, for example. When voltage $V_D$ exceeds the threshold, the output of comparator 204 may change state (e.g., the output may transition from a negative voltage to a positive voltage). In this example circuit, the output of comparator 204 will start out negative because the input voltages are initially the same (i.e., the voltage on control terminal 207 is initially equal to the voltage at the output of the programmable voltage source 202 before the current source turns on). After the current turns on, the voltage on the control terminal 207 will increase and trigger the comparator when the voltage increases by an amount that is greater than (or equal to) the threshold.

Circuit 200 further includes timer 206 may provide timing information relating to capacitance of the actuator control terminal 207 to the controller. Accordingly, the time period from timer 206 may be used to determine the lens displacement. The capacitance on control terminal 207 (denoted $C_{207}$) may be determined from the equation I=C dv/dt. Referring to circuit 200, capacitance at the control terminal 207 is as follows:

$$C_{207} = \frac{I_{ref}}{V_{TH}} * \Delta T,$$

where $\Delta T$ represents the time period provided by timer 206 and $V_{TH}$ represents the threshold voltage of comparator 204. In one embodiment, timer 206 may start in response to the enabling of the current source and stop in response to voltage difference $V_D$ exceeding the threshold. If comparator 204 and current source 205 are enabled simultaneously, the output of comparator 204 may be used as a timing signal that may have a time period corresponding to the capacitance and displacement of the actuator 208. In another embodiment, controller 201 may signal timer 206 to start in response to controller 201 sending an enabling signal to current source 205 and comparator 204 may signal timer 206 to stop in response to comparator 204 changing states as a result of voltage difference $V_D$ exceeding a threshold. In yet another embodiment, the enable signal sent to the current source to provide the reference current may include timing edges defining a time period therebetween. In this embodiment, comparator 204 provides a signal to stop the timing and disable current source 205. The time period from the enabling to the disabling of current source 204 represents the time period required for $I_{ref}$ to change an amount approximately equal to the threshold set on comparator 204.

Calibration circuit 200 may further comprise memory 209 coupled to controller 201. Memory 209 may include a lookup table of capacitance values and their corresponding linear displacement values. The lens displacement may be calibrated using a number of algorithms which may search for the capacitance that corresponds to the desired lens displacement, measure the capacitance, and adjust the voltage on control terminal 207 until the capacitance corresponds to the desired displacement.

The threshold of comparator 204 and reference current $I_{ref}$ may be small enough such that the changes in actuator voltage $V_A$ on control terminal 207 do not cause a displacement of the actuator. The accuracy of the displacement determination may depend on the measurement of the capacitance not changing actuator voltage $V_A$ very far from the original control voltage provided by programmable voltage source 202. For example, a threshold voltage of 0.7V may be used to measure the capacitance.

Figure 3:
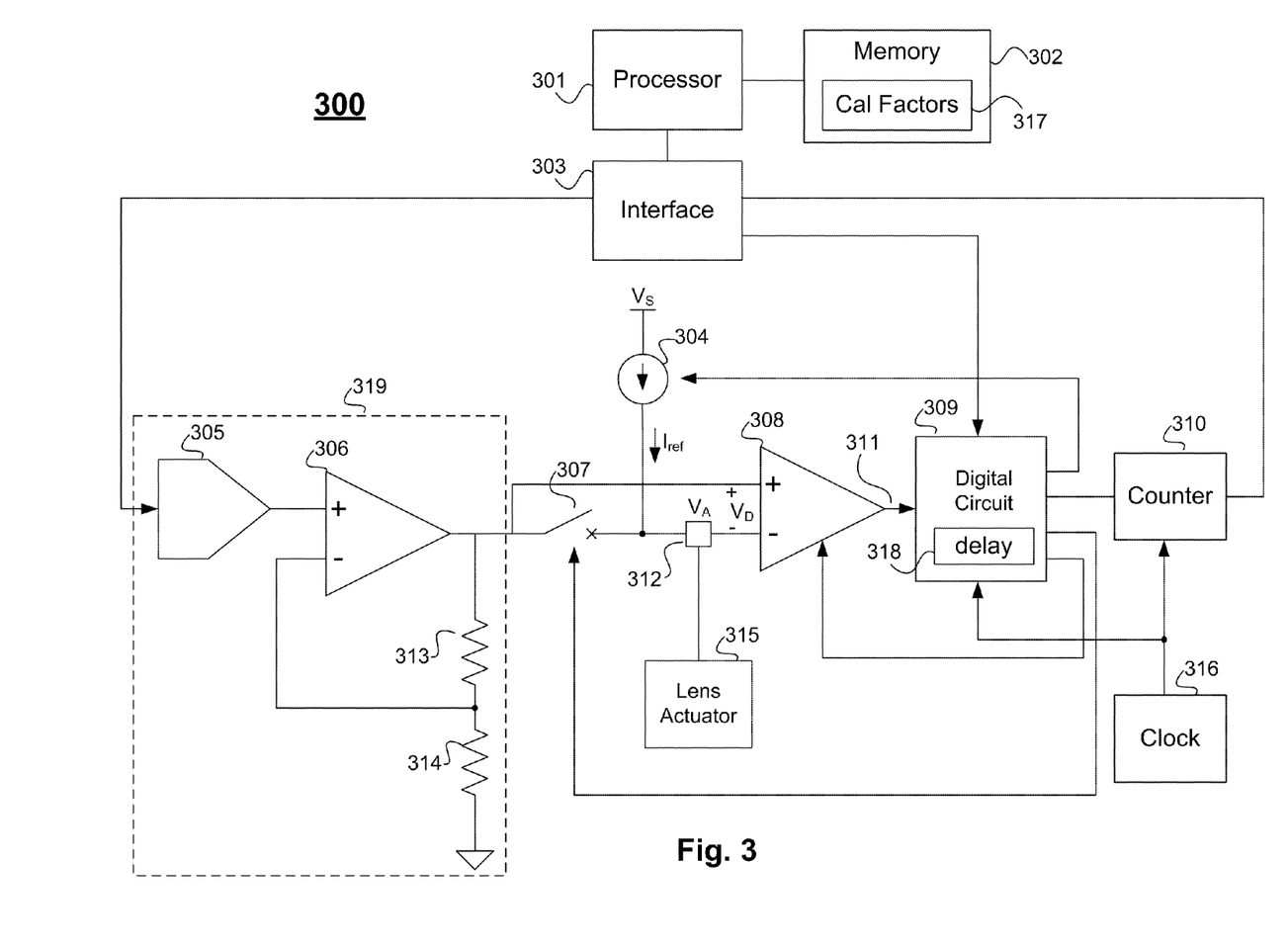
FIG. 3 illustrates a circuit for calibrating lens displacement according to another embodiment of the present invention.

FIG. 3 illustrates a circuit 300 for calibrating lens displacement according to another embodiment of the present invention. Components of the circuit 300 may be provided on a single integrated circuit, for example. Circuit 300 includes processor 301, memory 302, interface circuit 303, current source 304, programmable voltage source 319, switch 307, comparator 308, digital circuit 309, counter 310, control terminal 312, lens actuator 315, and clock circuit 316. Circuit 300 calibrates an actuator voltage $V_A$ according to a desired lens displacement for lens actuator 315 according to periodic timing measurements corresponding to a capacitance on the control terminal 312.

Programmable voltage source 319 includes digital to analog converter (DAC) 305, amplifier 306, resistor 313, and resistor 314. Programmable voltage source 319 provides a control voltage based on control signals provided from processor 301. Processor 301 provides control signals to interface 303. Interface 303 may be a bus interface such as I²C, for example. The control signals may be a serial or parallel data stream which designates the control voltage designated by processor 301.

DAC 305 receives digital value in the control signals and translates the value into a programmed analog voltage. Amplifier 306, resistor 313, and resistor 314 provide a fixed gain to the programmed analog voltage from the output of DAC 305. The output of amplifier 306 is coupled to the control terminal 312 of actuator 315 to apply the voltage and set a corresponding displacement.

Processor 301 may send a request to retrieve timing information regarding the current state of the actuator displacement. Interface 303 may initiate an activation signal to digital circuit 309. Digital circuit 309 may send a signal to switch 307 to temporarily decouple programmable voltage source 319 from control terminal 312 in response to the activation signal.

Switch 307 selectively decouples programmable voltage source 319 from control terminal 312. Switch 307 may be opened in response to the activation signal. Digital circuit 309 may include delay circuit 318. Delay circuit 318 may be a set of registers which utilize clock circuit 316. Delay circuit 318 may provide a delay to allow a settling after switch 307 is opened. This delay may improve the measurement.

Current source 304 provides a reference current $I_{ref}$ through control terminal 312 in response to an enable signal. The enable signal may be generated in response to the activation signal. The enable signal may be sent from the digital circuit 309 after the delay mentioned above. Actuator voltage $V_A$ on control terminal 312 changes in response to reference current $I_{ref}$.

Comparator 308 senses voltage difference $V_D$ between programmable voltage source 306 and control terminal 312. Comparator 308 may generate an output signal in response to voltage difference $V_D$ exceeding a threshold. In one embodiment, comparator 308 includes a built-in voltage offset which sets the threshold to a value less than 2V. This offset may be set by a second current source (not shown). The state of the output of comparator 308 may provide an output signal at location 311. Features and advantages of the present invention include using a comparator having a built-in offset voltage that detects differences between the input terminals of the comparator across a range of voltages. Accordingly, the voltage at the output of the programmable voltage source can be varied across a range of voltages corresponding to different actuator displacements, and a calibration circuit can measure corresponding capacitances at each voltage because the comparator threshold voltage is based on the voltage difference between comparator input terminals.

In one embodiment, digital circuit 309 resets the enable signal in response to a transition of output signal from comparator 308 when the voltage on terminal 312 crosses the threshold. The enable signal may include timing edges that define a timing period therebetween. The timing period represents the time for the actuator voltage $V_A$ to ramp up to the threshold voltage and corresponds to a capacitance on control terminal 312. The enable signal starts and stops current source 308 from sourcing $I_{ref}$. Additionally, counter 310 may receive the enable signal in order to determine the time period.

Counter 310 may function as a timer and use the enable signal and a clock signal from clock circuit 316 to determine the time period. Counter 301 may provide a number corresponding to the number of clock cycles which have passed from the time the enable signal was activated to the time it was deactivated. Counter 310 may provide a digital representation of the number to interface 303. Interface 303 may transfer this information to processor 301. Processor 310 is coupled to interface 303 to receive information associated with the timing period. The processor may also receive information regarding the value of $I_{ref}$ and the value of the voltage threshold Vth. The processor may calculate the corresponding capacitance as described above and use the information to calibrate the voltage $V_A$ to correspond to the lens displacement required.

Memory 302 is coupled to processor 301. Memory 302 may contain calibration factors 317 that correspond to the capacitance. For example, the calibration factors may include a table of capacitance to lens displacement entries.

An algorithm may be used to increment/decrement the actuator voltage $V_A$ to provide the target lens displacement. When a desired displacement is set, the algorithm may use the timing measurements to determine the capacitance at a given value of actuator voltage $V_A$. This capacitance may be used to determine the lens displacement for a current value of actuator voltage $V_A$. The algorithm may increment/decrement the actuator voltage $V_A$ in steps to calibrate according to the desired lens displacement for lens actuator 315.

Figure 4A:
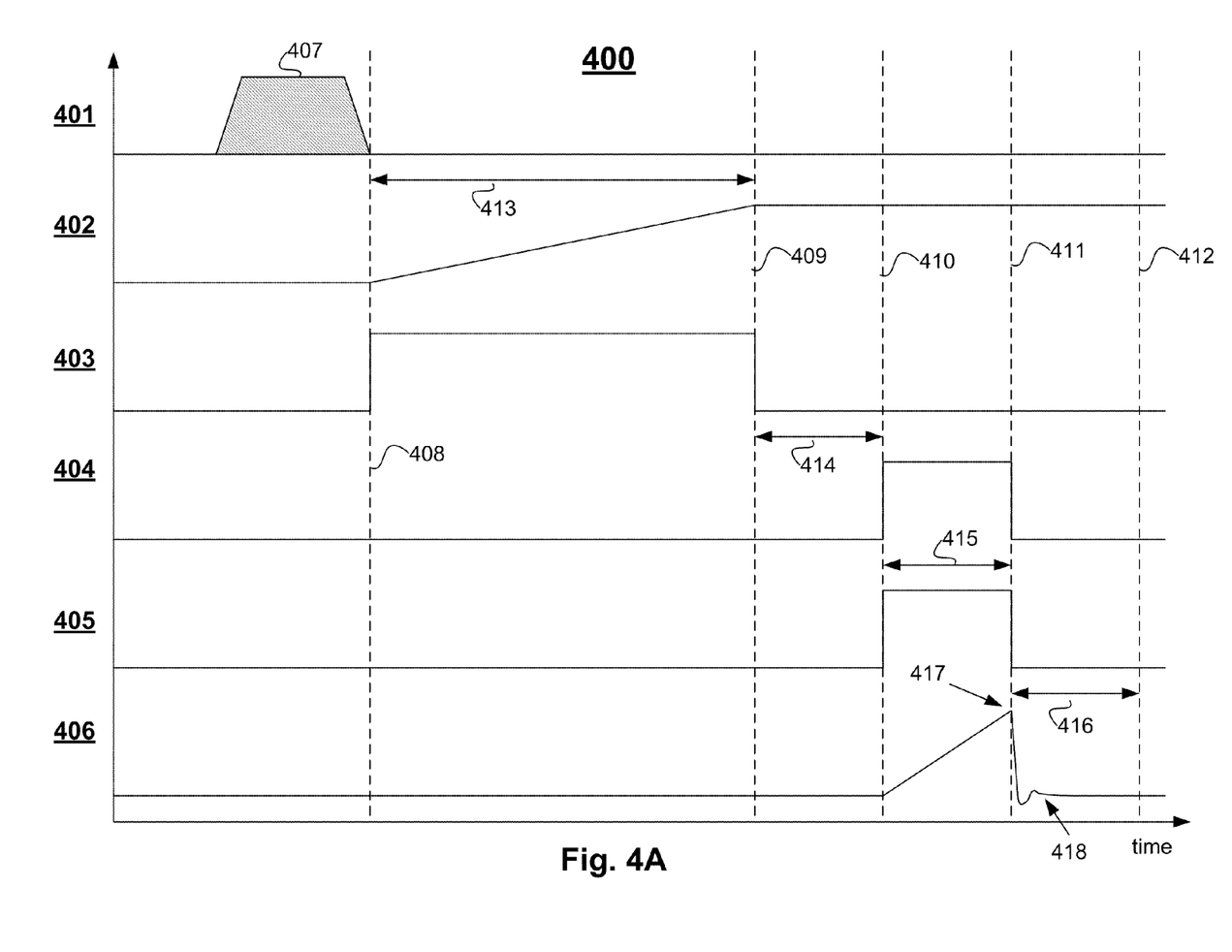
FIG. 4A illustrates a timing diagram of the operation of the calibration circuit 300 of FIG. 3.

FIG. 4A illustrates a timing diagram 400 of the operation of the calibration circuit 300 of FIG. 3. Timing diagram 400 includes waveforms 401-406. Waveform 401 includes a time period 407 in which processor 301 of FIG. 3 is sending instructions to interface 303. The instruction may be to change the actuator voltage to a new value (corresponding to a new lens actuator position) and to perform a timing measurement to retrieve a time period corresponding to the capacitance on the actuator control terminal for the specified voltage. This capacitance corresponding to the time period may be used to determine the actual displacement of the lens actuator and calibrate the actuator voltage such that the lens actuator is adjusted to the correct position (i.e. having the desired displacement).

Waveform 402 shows the actuator voltage changing from one actuator voltage to a new actuator voltage corresponding to a new lens position as specified in the instructions received during time period 407. The slewing period 413 may be typically 4.1 ms to 17.8 ms, for example. Waveform 403 shows a "AF busy" bit indicating that the actuator voltage is changing and no other instructions will be received during this time frame. "AF busy" bit is asserted starting at time point 408 and becomes unasserted at time point 409. Time period 414 indicates an unspecified duration until the capacitance measurement occurs, which may depend on the host controller or processor, for example.

Waveform 404 shows a "measure/busy" bit, which may initiate the measurement by activating the current source into the actuator control terminal. The "measure/busy" bit is set at time point 410 and reset at time point 411. Waveform 405 shows the current $I_{ref}$ being enabled at time point 410 in response to the "measure/busy" bit. $I_{ref}$ may be approximately 2 uA, for example. The resetting of the "measure/busy" bit may be responsive to the difference voltage $V_D$ increasing above a threshold as shown in waveform 406.

Waveform 406 shows the difference voltage $V_D$ between the programmed voltage source and the voltage on the actuator control terminal. The difference starts to increase when $I_{ref}$ is enabled at time point 410. At time point 411 waveform 406 reaches a threshold at point 417. The threshold may be 0.623V, for example. When this occurs, the reference current is turned off as illustrated by waveforms 405 going low, and the "measure/busy" illustrated by waveform 404 goes low indicating that the measurement has completed. Additionally, the switch is closed and the control voltage at the output of the programmable voltage source is re-coupled to the actuator control terminal. A typical duration of a measurement 415 may be between 5.83 us to 204 us, depending on the capacitance range of the actuator. Waveform 406 (difference voltage $V_D$) may have a recovery transient at point 418. In one embodiment, the recovery may be a maximum of 500 us.

Figure 4B:
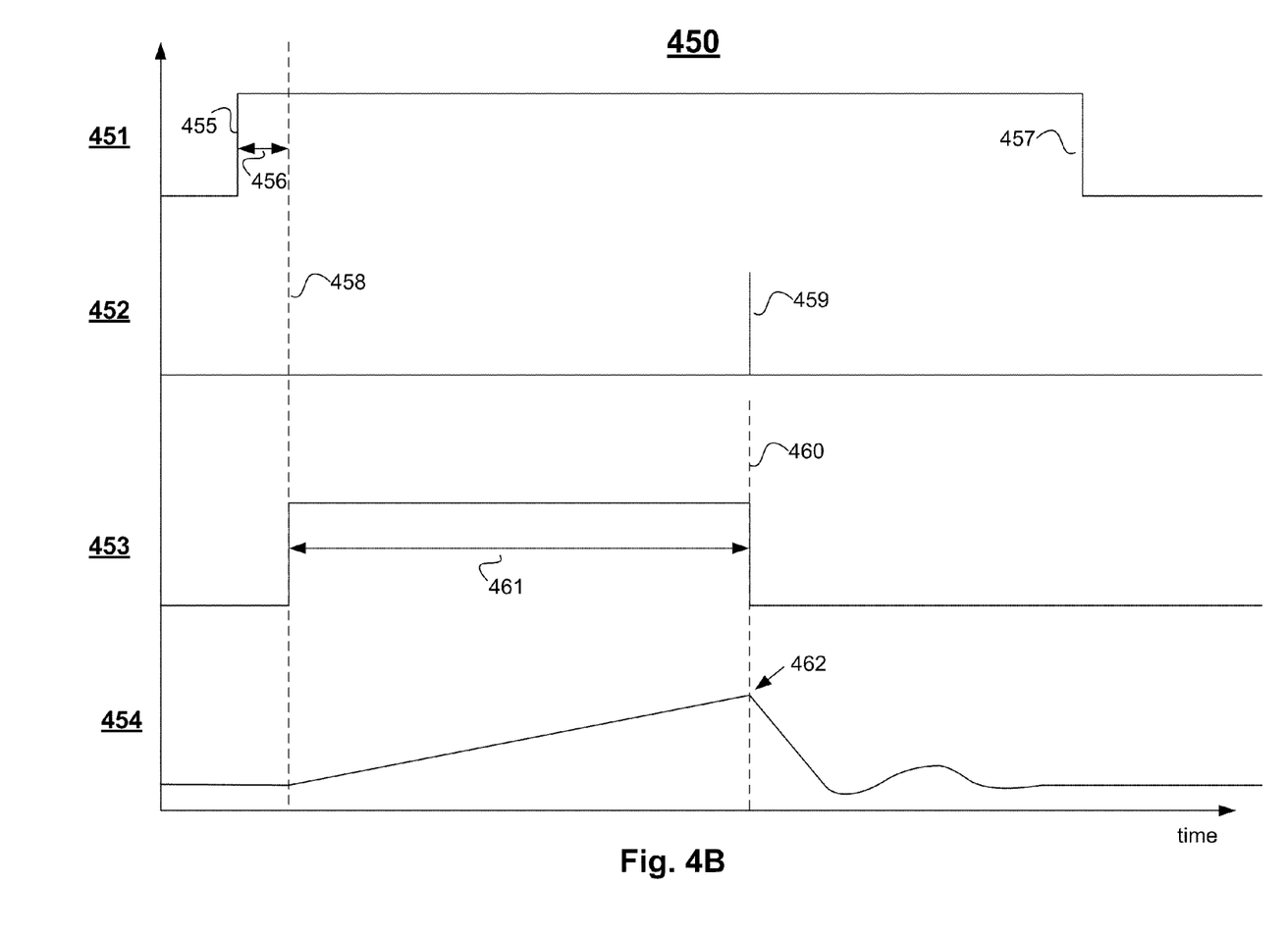
FIG. 4B illustrates a timing diagram that shows the timing measurement of one embodiment of the present invention in detail.
Figure 5:
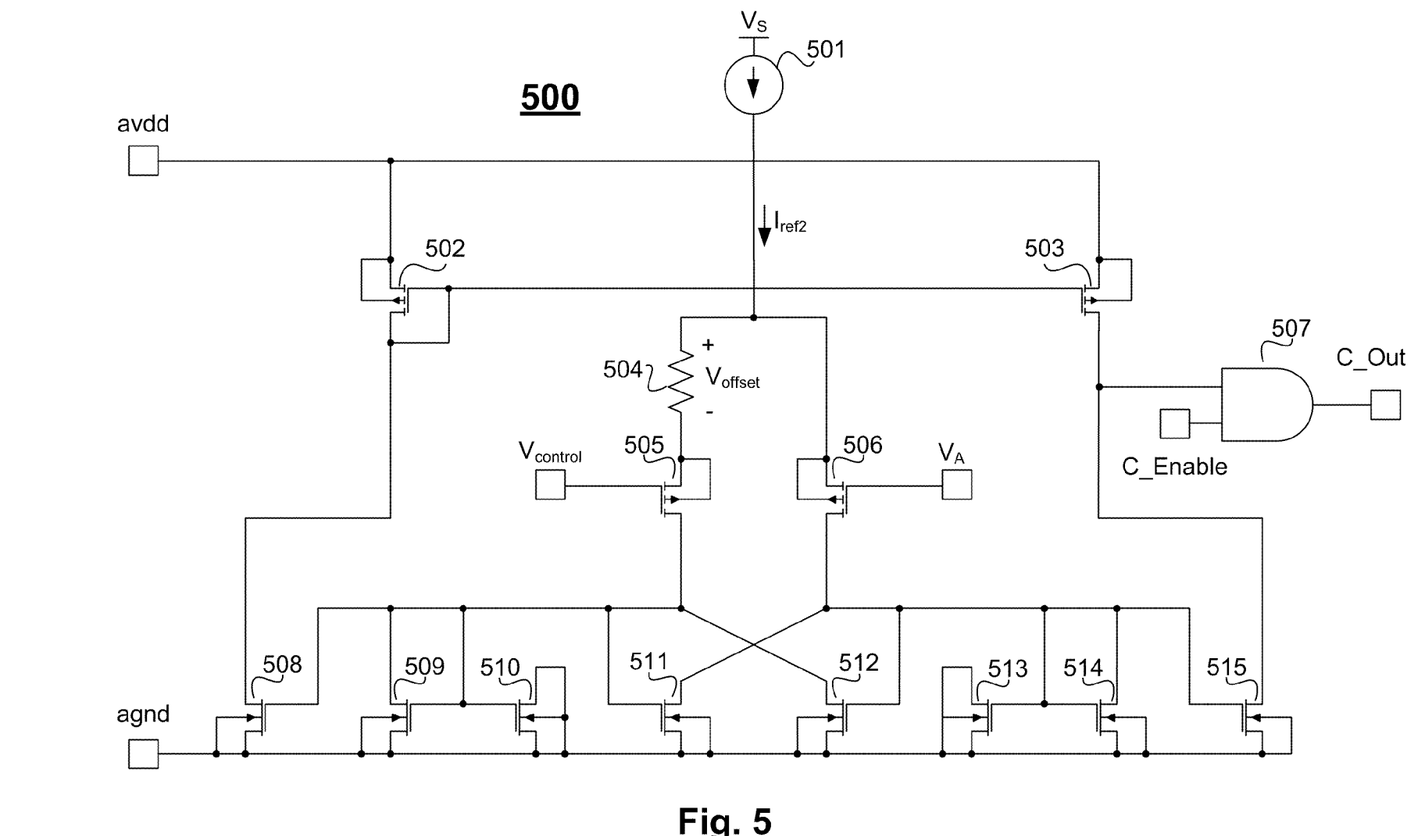
FIG. 5 illustrates a comparator circuit according to one embodiment of the present invention.

FIG. 4B illustrates a timing diagram 450 that shows the timing measurement of one example embodiment of the invention in detail. Timing diagram 450 includes waveforms 451-454. Activation waveform 451 shows the activation bit for starting a measurement, which is asserted at time point 455. After a delay 456, enable waveform 453 is asserted at time 458. The enable signal may start the reference current, counter, and comparator, and may be responsive to the activation signal and a delay. At this time 458, difference voltage waveform 454 starts to ramp. At time point 460, waveform 454 crosses a threshold at point 462. The comparator output waveform 452 shows how a comparator may respond with a pulse 459. Enable waveform 453 may be reset in response to pulse 459 and the programmable voltage source may be re-coupled to the actuator control terminal in response to the resetting of the enable waveform. The timing pulse 459 may be narrow due the comparator being disabled in response to the enable waveform being reset. The activation waveform 451 may be reset after a period of time following the measurement period to indicate to the system that the control voltage has settled and another request may be received. Time period 461 may be used to determine the capacitance and, furthermore, determine the actuator displacement FIG. 5 illustrates a comparator circuit 500 according to one embodiment of the present invention. Comparator circuit 500 includes a differential pair comprised of transistors 505 and 506. Current source 501 provides reference current $I_{ref2}$ to a first leg and a second leg of the differential pair. Current source 501 may be derived from another reference current provided by another circuit. Resistor 504 is coupled between the first leg (one terminal of transistor 505) and current source 501. Resistor 504 and reference current $I_{ref2}$ establish a voltage offset $V_{offset}$. This offset may establish a threshold for comparator circuit 500. Transistors 511 and 512 are cross-coupled to the differential pair's output terminals. The cross-coupled pair are coupled to output transistors 508 and 509 which steer current between transistors 502 and 503 which are in a current mirror configuration. An intermediate node between the channel of transistor 503 and 515 is coupled to one input of AND gate 507. The other input terminal of AND gate 507 is coupled to receive a comparator enable signal. An output terminal of AND gate 507 is coupled to the output of the comparator circuit 500. Transistors 509-510 provide biasing to transistor 505 and transistors 513-514 provide biasing to transistor 506.

Figure 6:
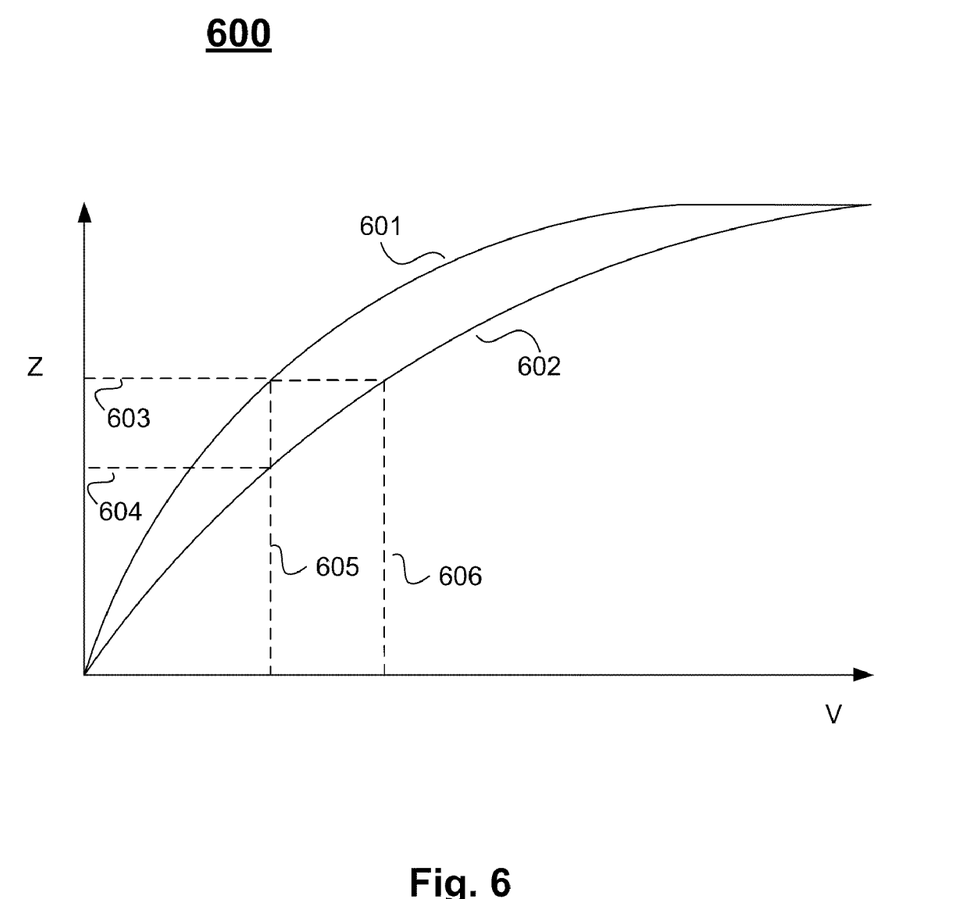
FIG. 6 illustrates a graph showing how lens orientation may change calibration voltages.

FIG. 6A illustrates a graph 600 showing how lens orientation may change calibration voltages. Characteristic 601 shows a relationship of voltage vs. horizontal lens actuator displacement. Horizontal lens actuator displacement occurs without any gravitational force in the direction of displacement. Characteristic 602 shows a relationship of voltage vs.

non-horizontal lens actuator displacement. Non-horizontal lens actuator displacement occurs with some gravitational force against the direction of displacement. A non-horizontal lens actuator displacement may occur if the camera (which houses the actuator) is placed at an upward angle, for example. The lens actuator may require a greater voltage to move the lens when the lens actuator needs to move against gravitational forces.

The original calibration may have shown that lens displacement 603 corresponded to voltage 605. A user may tilt the camera (housing the actuator) at an angle. A timing measurement, used to determine the capacitance at the control terminal, may reveal that the actual displacement 604 may be significantly different than the calibrated values. In this case, a processor within the camera may start a AF calibration routine which recalculates a target voltage based on displacement 604 and target displacement 603. The AF routine may dynamically calibrate the actuator voltage to voltage 606 by incrementally adjusting the target voltage using information gained from the timing measurements.

Figure 7A:
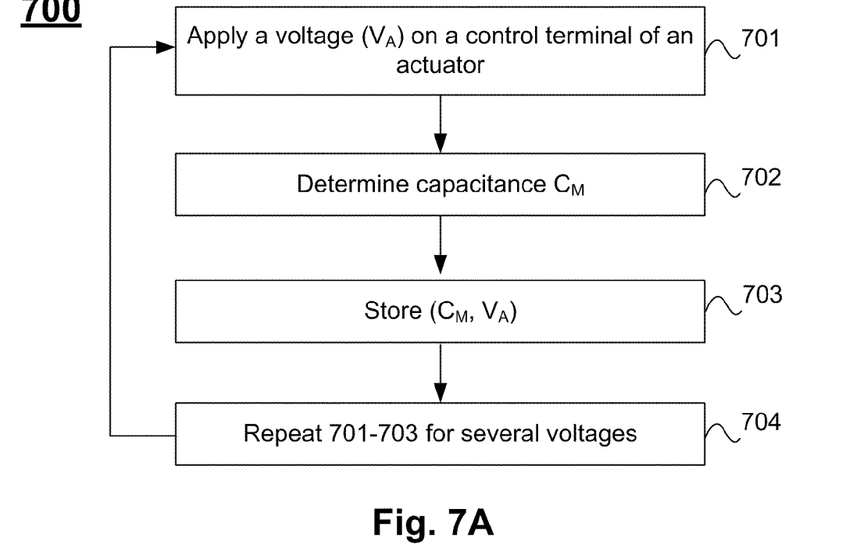
FIG. 7A illustrates a method for initial calibration of lens displacement parameters according to one embodiment of the present invention.

FIG. 7A illustrates a method for initial calibration of lens displacement parameters 700 according to one embodiment of the present invention. At 701 a voltage is applied on the control terminal of the actuator. At 702, the capacitance $C_M$ is determined using a timing measurement. At 703, the values of capacitance are stored along with the corresponding actuator voltages (e.g. ($C_M$, $V_A$) pairs). At 704, 701-703 are repeated for other actuator voltage values.

Figure 7B:
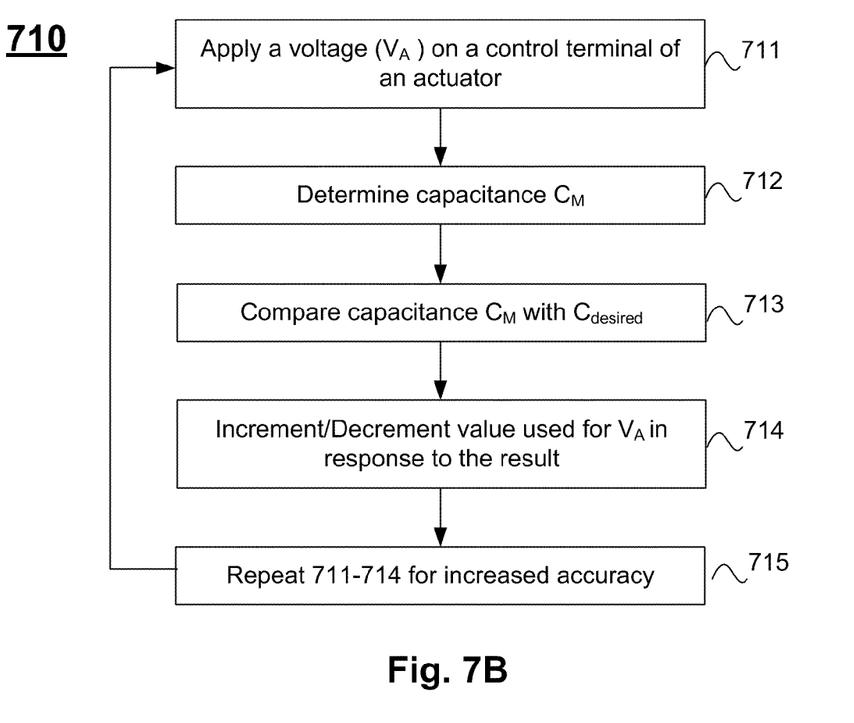
FIG. 7B illustrates a method for dynamic calibration of lens displacement according to another embodiment of the present invention.

FIG. 7B illustrates a method for dynamic calibration of lens displacement 710 according to another embodiment of the present invention. At 711, a voltage $V_A$ is applied on the control terminal of an actuator. At 712, the capacitance $C_M$ is determined using a timing measurement. At 713, the measured value of capacitance $C_M$ is compared to the desired capacitance $C_{desired}$ corresponding to the lens displacement desired. At 714, a value used for actuator voltage $V_A$ may be incremented/decremented according to the comparison of 713. The new actuator voltage value may be determined according to an algorithm to modify $C_M$ to be closer to $C_{desired}$. At 705, 711-714 may be repeated until a predetermined accuracy is achieved.

Figure 8:
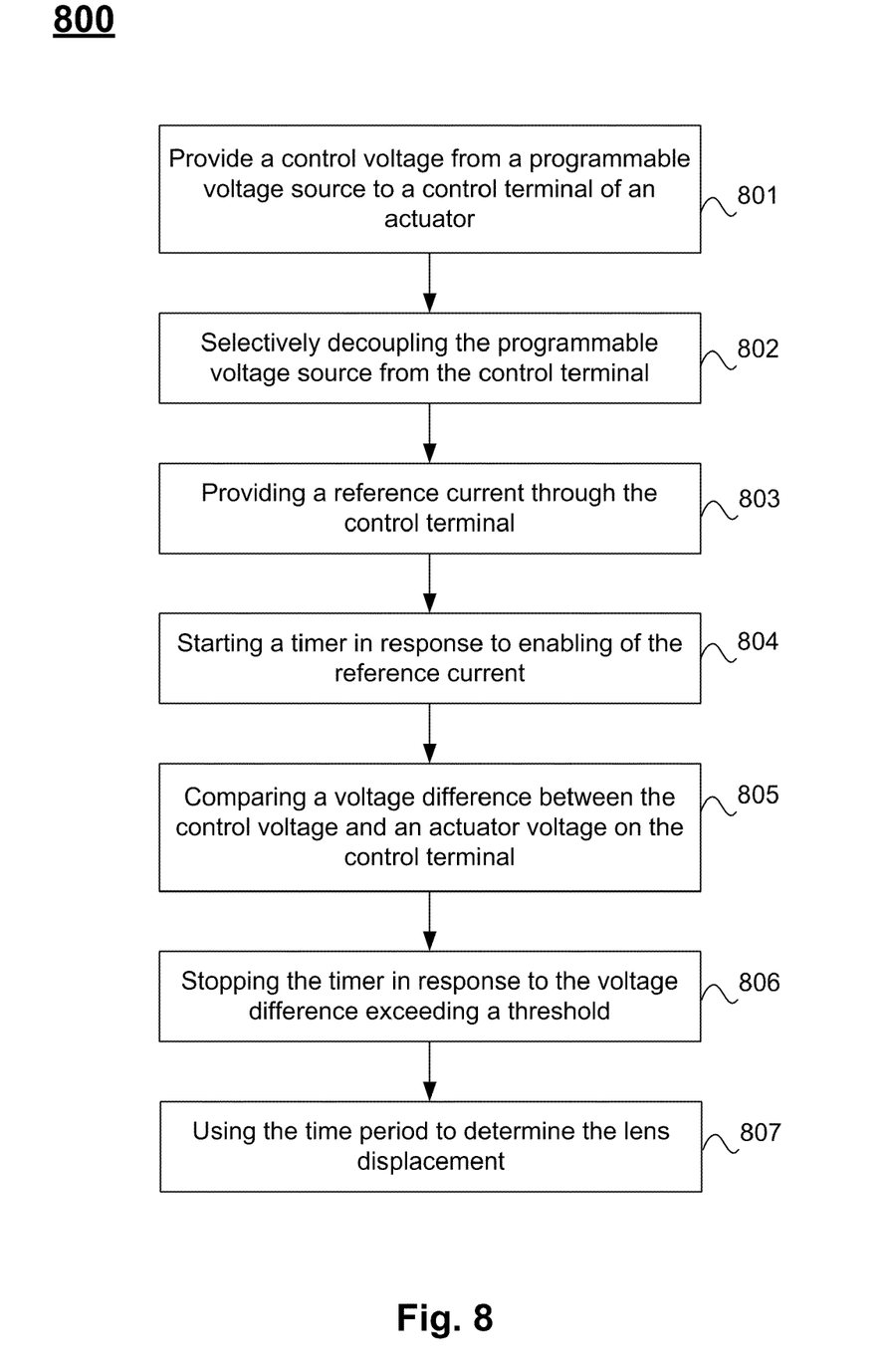
FIG. 8 illustrates a method for calibrating lens displacement according to yet another embodiment of the present invention.

FIG. 8 illustrates a method for calibrating lens displacement 800 according to yet another embodiment of the present invention. At 801, a control voltage from a programmable voltage source may be provided to a control terminal of an actuator to set a lens displacement. At 802, the programmable voltage source may be selectively decoupled from the control terminal. At 803, a reference current may be provided through the control terminal from a current source. At 804, a timer may be started in response to enabling of the reference current. At 805, a voltage difference between the control voltage and an actuator voltage on the control terminal may be compared. The actuator voltage changes in response to the reference current. At 806, the timer may be stopped in response to the voltage difference exceeding a threshold. At 807, a time period, between the starting and the stopping of the timer, may be used to determine the lens displacement.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A calibration circuit comprising:
    a programmable voltage source that provides a control voltage to a control terminal of an actuator to set a lens displacement of the actuator;
    a switch that selectively decouples said programmable voltage source from said control terminal in response to a first signal;
    a current source that provides a reference current to said control terminal when the control terminal is decoupled from said programmable voltage source;
    a comparator that senses a voltage difference between said programmable voltage source and said control terminal; and
    a timer coupled to an output of the comparator,
    wherein the timer measures a time period between a point in time when the current source is activated and a point in time when the voltage difference between said programmable voltage source and said control terminal increases to a threshold.

2. The circuit of claim 1 wherein said time period is used to determine said lens displacement.

3. The circuit of claim 1 further comprising a controller for programming the programmable voltage source and receiving timing information from the timer.

4. The circuit of claim 3 further comprising a memory coupled to said controller, wherein said controller retrieves calibration factors from said memory to determine said lens displacement.

5. The circuit of claim 1 wherein said timer is a counter.

6. The circuit of claim 1 wherein the comparator is enabled after a settling period associated with said decoupling.

7. The circuit of claim 1 wherein the programmable voltage source includes a digital-to-analog converter.

8. The circuit of claim 7 wherein the programmable voltage source, the current source, the comparator, and the timer are manufactured on a signal integrated circuit.

9. The circuit of claim 7 wherein the signal integrated circuit further comprises a digital interface to receive program voltages and send said time period.

10. A method of calibrating lens displacement comprising:
    providing a control voltage from a programmable voltage source to a control terminal of an actuator to set a lens displacement of the actuator;
    selectively decoupling said programmable voltage source from said control terminal in response to a first signal;
    providing a reference current to said control terminal from a current source when the control terminal is decoupled from said programmable voltage source;
    comparing a voltage difference between said control voltage from the programmable voltage source and a voltage on said control terminal, wherein said voltage on said control terminal changes in response to said reference current;
    measuring a time period between a point in time when the current source is activated and a point in time when the voltage difference increases to a threshold.

11. The method of claim 10 wherein said time period is used to determine said lens displacement.

12. The method of claim 10 wherein said time period is used to generate a plurality of voltages and corresponding lens displacements.

13. The method of claim 10 wherein said time period is used to determine said lens displacements in a digital camera.

14. The method of claim 10 wherein said time period is used to determine said lens displacements in a digital camera while the camera is in use.

15. The method of claim 10 further comprising programming the programmable voltage source from a controller and receiving timing information from the timer in said controller.

16. The method of claim 15 further comprising storing calibration factors in a memory coupled to said controller, wherein said controller retrieves calibration factors from said memory to determine said lens displacement.

17. The method of claim 10 wherein said measuring a time period is performed by a counter.

18. The method of claim 10 wherein said comparing occurs after a settling period associated with said decoupling.

19. The method of claim 10 wherein providing a control voltage includes receiving a digital signal representing a voltage to be applied to said actuator, and converting the digital signal to an analog voltage.

* * * * *